US012276144B1

(12) United States Patent
Lee

(10) Patent No.: US 12,276,144 B1
(45) Date of Patent: Apr. 15, 2025

(54) DOOR SECURITY DEVICE

(71) Applicant: Sang Choon Lee, Daegu (KR)

(72) Inventor: Sang Choon Lee, Daegu (KR)

(*) Notice: Subject to any disclaimer, the term of this patent is extended or adjusted under 35 U.S.C. 154(b) by 0 days.

(21) Appl. No.: 18/783,362

(22) Filed: Jul. 24, 2024

(30) Foreign Application Priority Data

Apr. 25, 2024 (KR) ........................ 10-2024-0055611

(51) Int. Cl.
*E05C 17/54* (2006.01)
*G08B 13/08* (2006.01)

(52) U.S. Cl.
CPC .............. *E05C 17/54* (2013.01); *G08B 13/08* (2013.01)

(58) Field of Classification Search
CPC ................................ E05C 17/54; G08B 13/08
See application file for complete search history.

(56) References Cited

U.S. PATENT DOCUMENTS 5,566,993 A * 10/1996 Olivas ................... E05C 19/182 292/288
5,664,814 A * 9/1997 Lin ....................... E05C 19/182 292/296
5,836,626 A * 11/1998 Coy ...................... E05C 19/182 292/289
6,755,450 B1 * 6/2004 Chen ..................... E05C 19/182 292/289
8,376,422 B2 * 2/2013 Swink ................... E05B 15/021 292/288
9,546,505 B1 * 1/2017 McEachern ............. E05C 17/60
11,542,734 B1 * 1/2023 Gunkler .................. E05C 17/02
11,591,836 B1 * 2/2023 Johnson .................. E05C 17/30
D993,742 S * 8/2023 Yu .................................. D8/339
2005/0017518 A1 * 1/2005 Marra ................... E05C 19/182 292/251.5
2005/0046201 A1 * 3/2005 Patire .................... E05C 19/182 292/289
2005/0116479 A1 * 6/2005 Lin ....................... E05C 19/182 292/288

FOREIGN PATENT DOCUMENTS

KR 100893655 B1 4/2009

* cited by examiner

*Primary Examiner* — Mark A Williams
(74) *Attorney, Agent, or Firm* — NKL Law; Jae Youn Kim

(57) ABSTRACT

Provided is a self-acting door security device including a latch bolt of a locking module installed on a swinging door and engaging with a latch hole of a striker mounted on a door frame to enable the locking/unlocking the swinging door. The self-acting door security device can be easily installed in a gap between a door and a door frame to quickly detect forced opening of the door by an intruder, thereby securing personal safety. The self-acting door security device has an improved structure such that the door can be opened without interference from a latch bolt even in a malfunction condition that the latch bolt of an existing lock module installed on the door is not fully inserted, thereby enabling quick evacuation in emergency situations including fires. The self-acting door security device includes an insert plate, a locker plate, a fastening piece, a stop holder, and a stopper member.

13 Claims, 8 Drawing Sheets

DOOR SECURITY DEVICE

CROSS REFERENCE TO RELATED APPLICATIONS

This US patent application claims priority under 35 USC 119 of Korean Patent Application No. 10-2024-0055611, filed on Apr. 25, 2024, the entire contents of which are hereby incorporated by reference.

TECHNICAL FIELD

The present invention relates to a self-acting door security device, and more specifically, to a self-acting door security device, which can be easily installed in a gap between a door and a door frame to secure personal safety by quickly detecting forced opening of the door by an intruder, and particularly, is improved in structure such that the door can be opened without interference from a latch bolt even in a malfunction condition that the latch bolt of an existing lock module installed on the door cannot be not fully inserted, thereby enabling quick evacuation in emergency situations, such as fires.

BACKGROUND ART

Typically, a door lock is installed on an entrance door such as a front door to protect life and safety from an intruder. With the technological advancement, digital door locks for enhancing convenience in manipulation and security have become widely distributed.

Such a digital door lock, in addition to the locking/unlocking function, has various functions of an intrusion detection module, a mechanical impact prevention, an alarm, and an external notification, and a fire detection function to allow quick and convenient exit from the inside in case of a fire or other emergency situations.

As a conventionally disclosed door lock, Korean Patent No. 10-0893655 discloses a security device installed in a front door structure. The security device installed in the front door structure, which includes a door frame forming a gate, a door hinge-coupled to the door frame, a door handle installed at one side of the door and having a locking function, a lock hole formed in the door frame and coupled to a lock to correspond to the door handle, and a finishing piece integrally formed and protruding on an outer edge of the door to a predetermined length, comprises: a long member installed on the finishing piece to block the gap between the door and the door frame; and auxiliary security means coupled to the long member and formed at a position corresponding to the lock and lock hole.

The conventional art is installed at the side end of a door to protect a door lock mechanism, thereby preventing illegal dismantling of the door lock mechanism. However, if the door lock mechanism is legitimately unlocked from the outside, there is no method to prevent intrusion. So, for example, with an increase of the number of travelers, when travelers use accommodations, incidents where an outsider legitimately unlocks the door lock using a key or a code to intrude into the accommodations frequently occur.

DISCLOSURE

Technical Problem

Accordingly, the present invention has been made in view of the above-mentioned problems occurring in the related art, and it is an objective of the present invention to provide a self-acting door security device, which can be easily installed in a gap between a door and a door frame to secure personal safety by quickly detecting forced opening of the door by an intruder, and particularly, is improved in structure such that the door can be opened without interference from a latch bolt even in a malfunction condition that the latch bolt of an existing lock module installed on the door cannot be not fully inserted, thereby enabling quick evacuation in emergency situations, such as fires.

Technical Solution

To accomplish the above-mentioned objects, according to the present invention, there is provided a self-acting door security device, which includes a latch bolt of a locking module installed on a swinging door and engaging with a latch hole of a striker mounted on a door frame to enable the locking/unlocking operation of the swinging door, including: an insert plate provided to be inserted into a gap between the door and the door frame; a locker plate connected to the insert plate and configured to be exposed outside the gap; a fastening piece protruding on the outer end of the insert plate, and configured to engage with the latch hole of the striker; a stop holder formed through the locker plate; and a stopper member including a stop pin which is formed to be fastened to the stop holder, and configured to restrain the door by being mounted on the locker plate through the stop pin.

In this instance, the self-acting door security device further includes an intrusion detection unit installed on the stopper member to detect operational force in the opening direction of the door. The intrusion detection unit includes: a sensor exposed on the outer peripheral surface of the stopper member to detect the operational force in the opening direction of the door; and an alarm module operating according to a detection signal from the sensor to output one or more alarm signals such as a sound alarm, warning light, vibration, or message transmission between mobile devices using near-field communication.

Moreover, when the door is opened, the door is operated to be closed while the fastening piece is inserted into the latch hole of the striker, so the insert plate is restrained to the gap, when the stop pin of the stopper member is fastened to the stop holder of the locker plate, the door is limited in movement in the opening direction by the stopper member, and when a forced opening force is applied to the door by an intruder, at the moment that the switch of the intrusion detection unit is touched by the door, the alarm module outputs an alarm signal.

Furthermore, the insert plate and the fastening piece are installed on both ends of the locker plate in opposite directions to each other.

Additionally, a plurality of the stop holders are spaced apart from each other, and are placed at different distances from the fastening piece, and are provided to adjust the installation spacing of the stopper members according to door specifications.

In addition, the stop holder includes: an insertion hole through which the expansion piece is inserted; and a fitting hole connected to the insertion hole and having a size smaller than that of the insertion hole to engage with the shaft, wherein the stop pin includes a shaft installed on the stopper member and fitted into the stop holder, and is formed to be expanded at the end of the shaft to be restrained at the rear surface of the stopper member.

Moreover, the stop holder includes a shaft installed on the stopper member and fitted into the stop holder, and an expansion piece formed at the end of the shaft and restrained at the rear surface of the stopper member. The stop holder includes: an insertion hole into which the expansion piece is inserted; an inclined rail which is connected to the insertion hole, has an elongated hole having a diameter smaller than that of the insertion hole to accommodate the shaft, and is formed with a slope angle inclining toward the fastening piece as it goes downwards; and a fitting hole which is arranged on the inclined rail to be spaced, has a size smaller than that of the insertion hole to engage with the shaft. The fitting hole is formed in the opposite direction to the insert plate based on the inclined rail, and when the shaft moves downward along the inclined rail, the stopper member is inclinedly moved so that the shaft is engaged and restrained in the fitting hole at the point where the stopper member is in close contact with the door.

Furthermore, the stop holder includes a shaft installed on the stopper member and fitted into the stop holder, and an expansion piece formed at the end of the shaft and restrained at the rear surface of the stopper member. The expansion piece is formed in a circular shape, and includes a key surface formed on the outer circumferential surface thereof, and a mating hole formed on the locker plate to have the same shape as the expansion piece. After the expansion piece is inserted into the mating hole at a predetermined angle in alignment with the mating hole, when the angle of the stopper member is changed, the stopper member is mounted on the locker plate while the key surface of the expansion piece is constrained in a misaligned state with the mating hole, thereby preventing loss during storage.

In addition, the stop pin is eccentrically positioned towards one side at the longitudinal center of the stopper member, the switch of the intrusion detection unit is arranged on the side of the stopper member corresponding to the stop pin, and when the stop pin of the stopper member is mounted on the stop holder, the switch (61) maintains an upright position so that the end of the stopper member (50) where the stop pin (51) is located at the upper portion due to its weight, and is arranged to face the door (1), such that the switch can accurately detect even the slightest opening operational force of the door.

Advantageous Effect

According to an embodiment of the present invention, the self-acting door security device can be easily installed in a gap between a door and a door frame to secure personal safety by quickly detecting forced opening of the door by an intruder, and particularly, is improved in structure such that the door can be opened without interference from a latch bolt even in a malfunction condition that the latch bolt of an existing lock module installed on the door cannot be not fully inserted, thereby enabling quick evacuation in emergency situations, such as fires.

MODE FOR INVENTION

Hereinafter, preferred embodiments of the present invention are described in detail with reference to the accompanying drawings.

Figure 1:
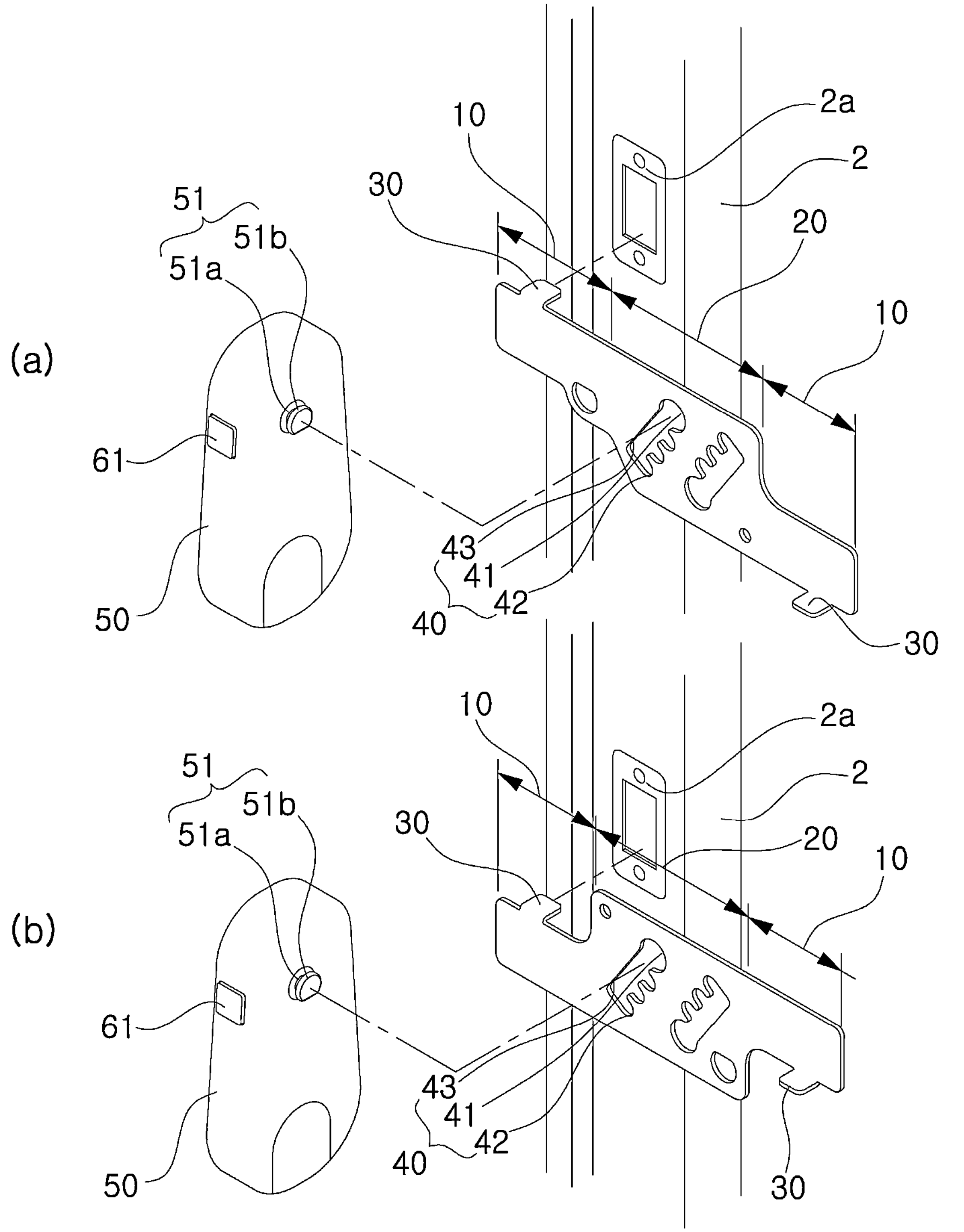
FIG. 1 is a configuration diagram illustrating a self-acting door security device according to an embodiment of the present invention.
Figure 2:
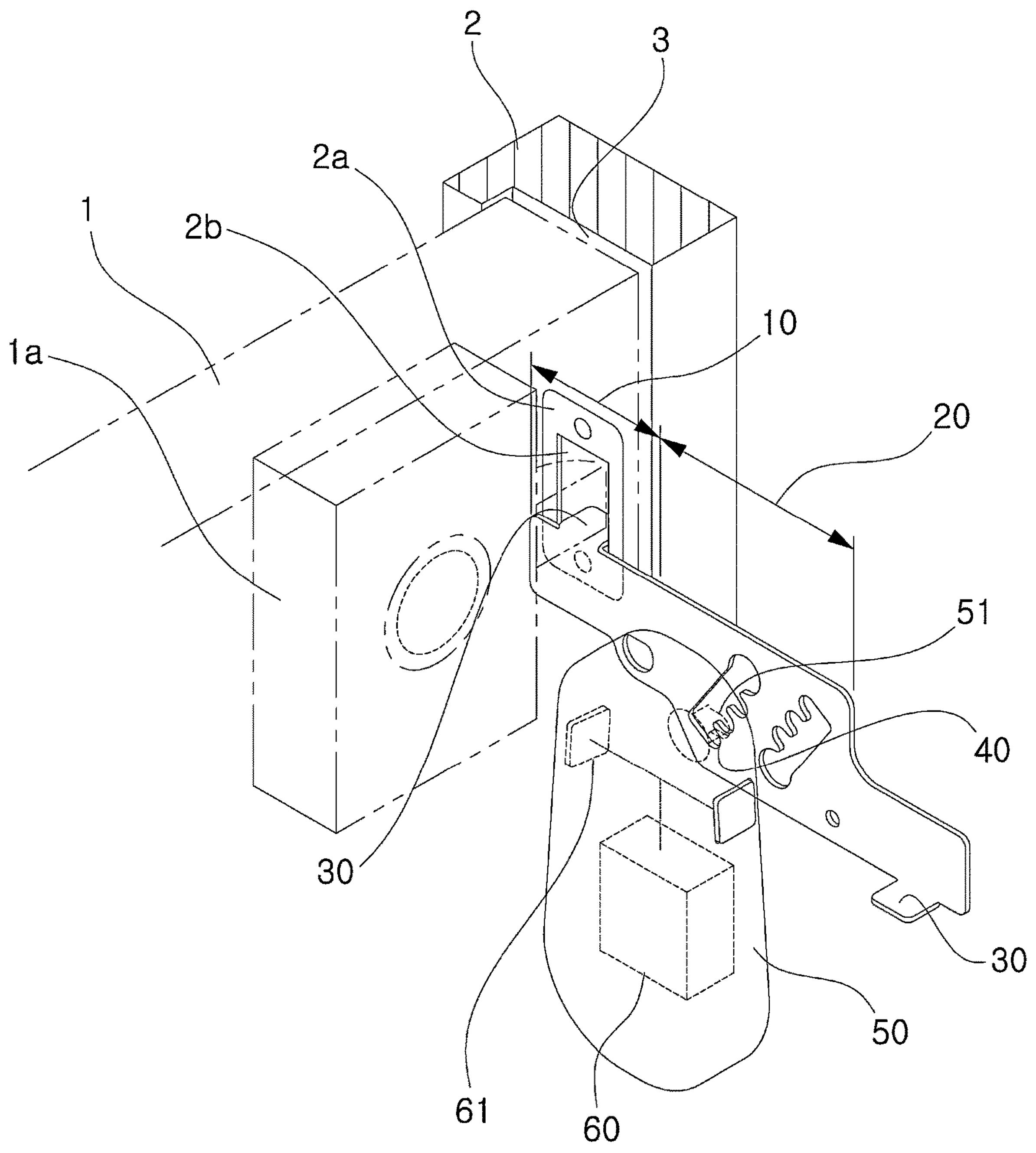
FIG. 2 is a configuration diagram illustrating an installed state of the self-acting door security device according to an embodiment of the present invention.
Figure 3:
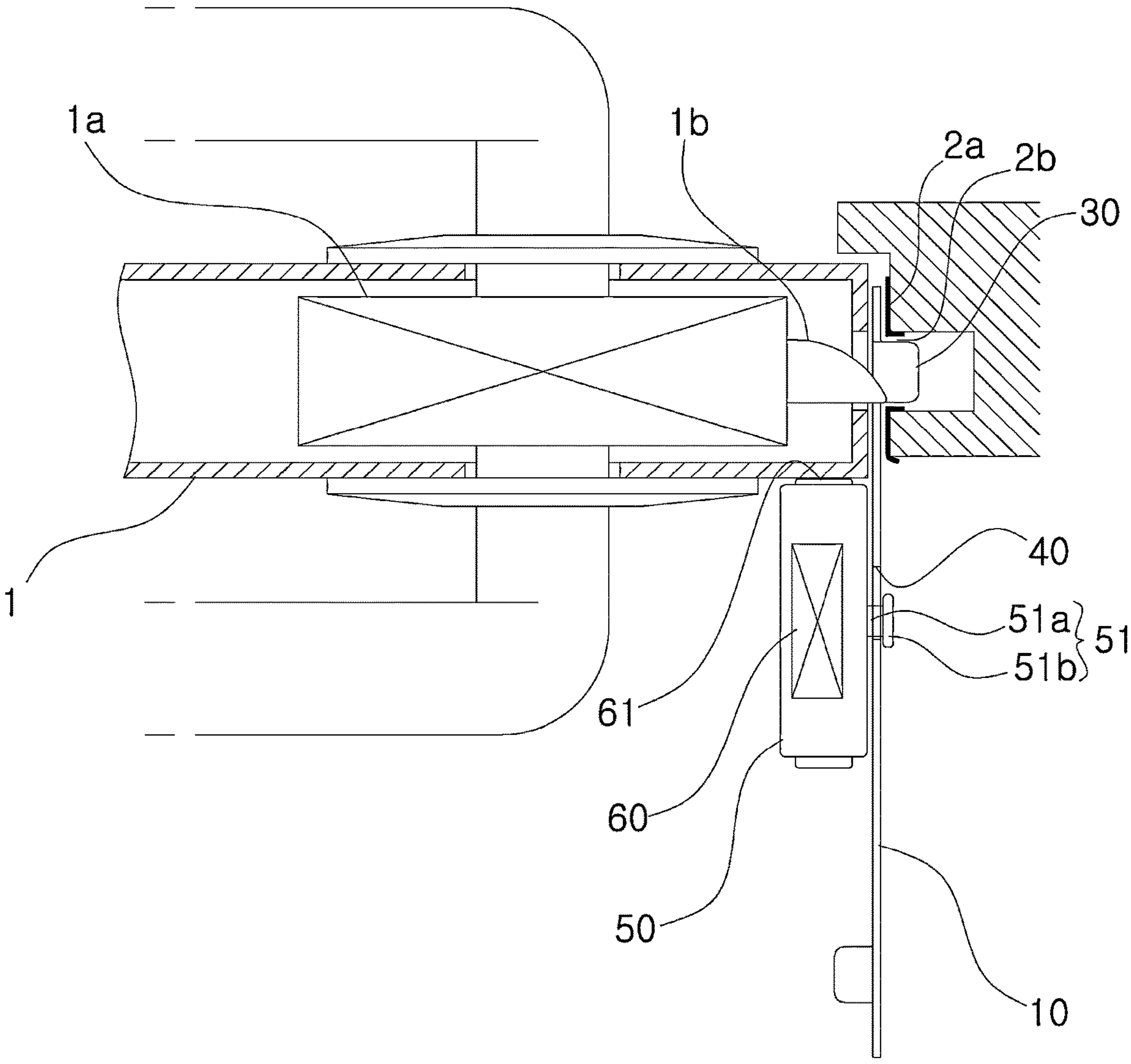
FIG. 3 is a cross-sectional view illustrating the installed state of the self-acting door security device according to an embodiment of the present invention.
Figure 4:
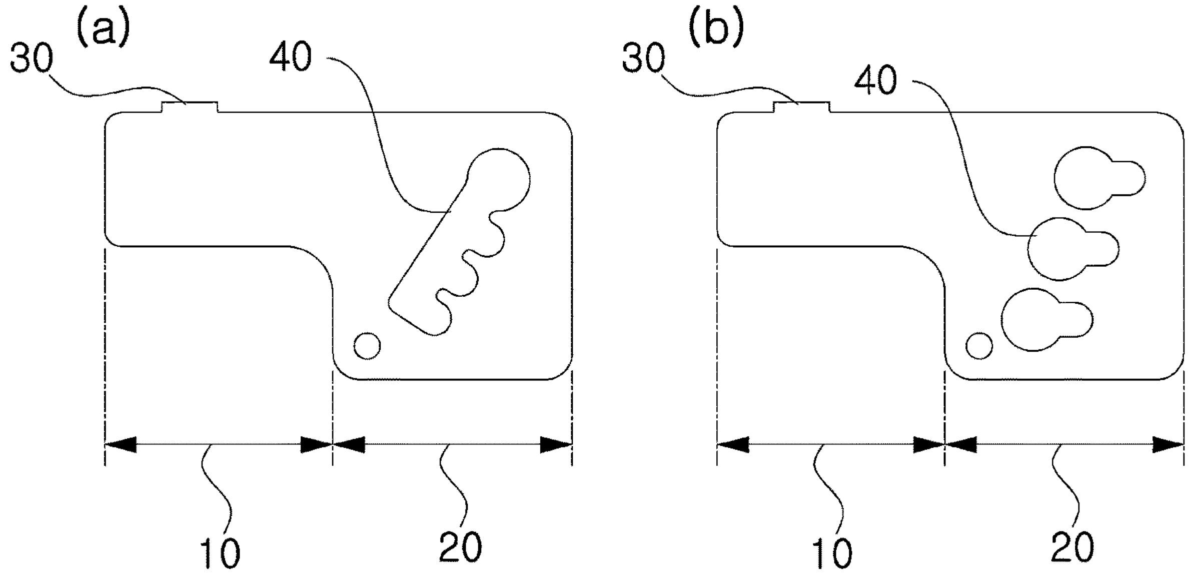
FIGS. 4 to 5 are configuration diagrams illustrating an insert plate and a stop holder of the self-acting door security device according to a modification of the present invention.
Figure 5:
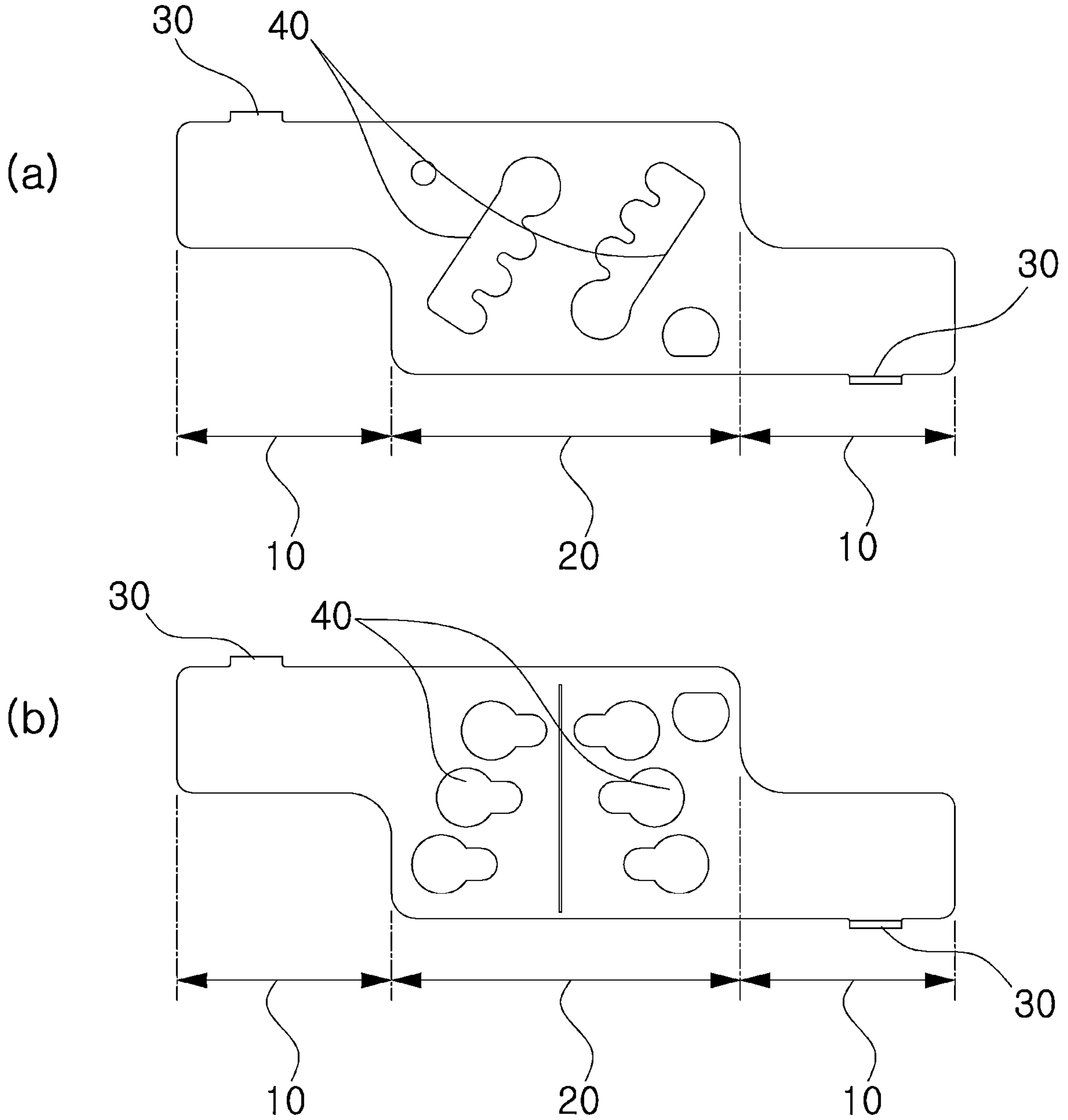
Figure 6:
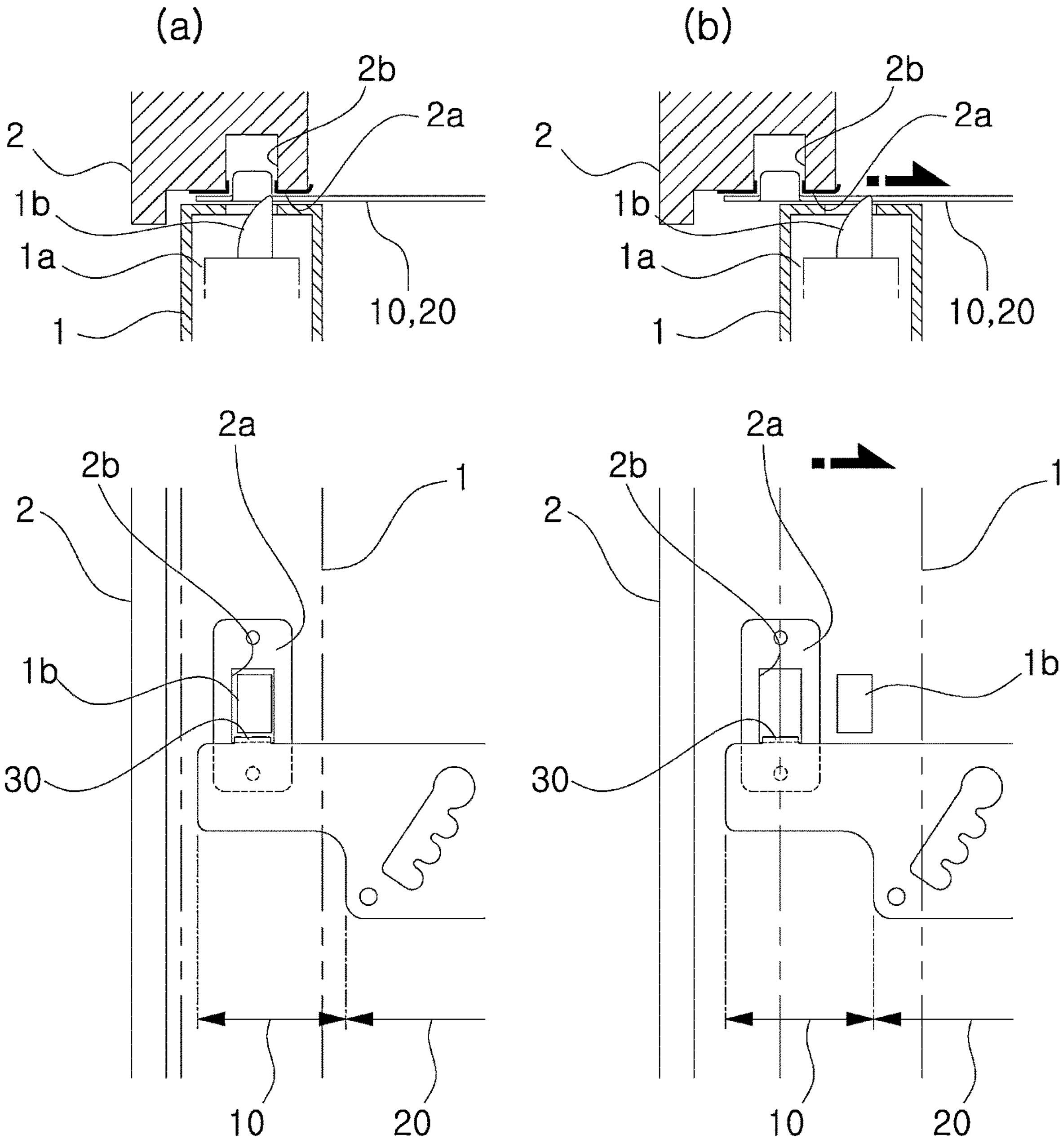
FIG. 6 is a configuration diagram illustrating a state in which a door operates to open without interference with the insert plate of the self-acting door security device according to an embodiment of the present invention.
Figure 7:
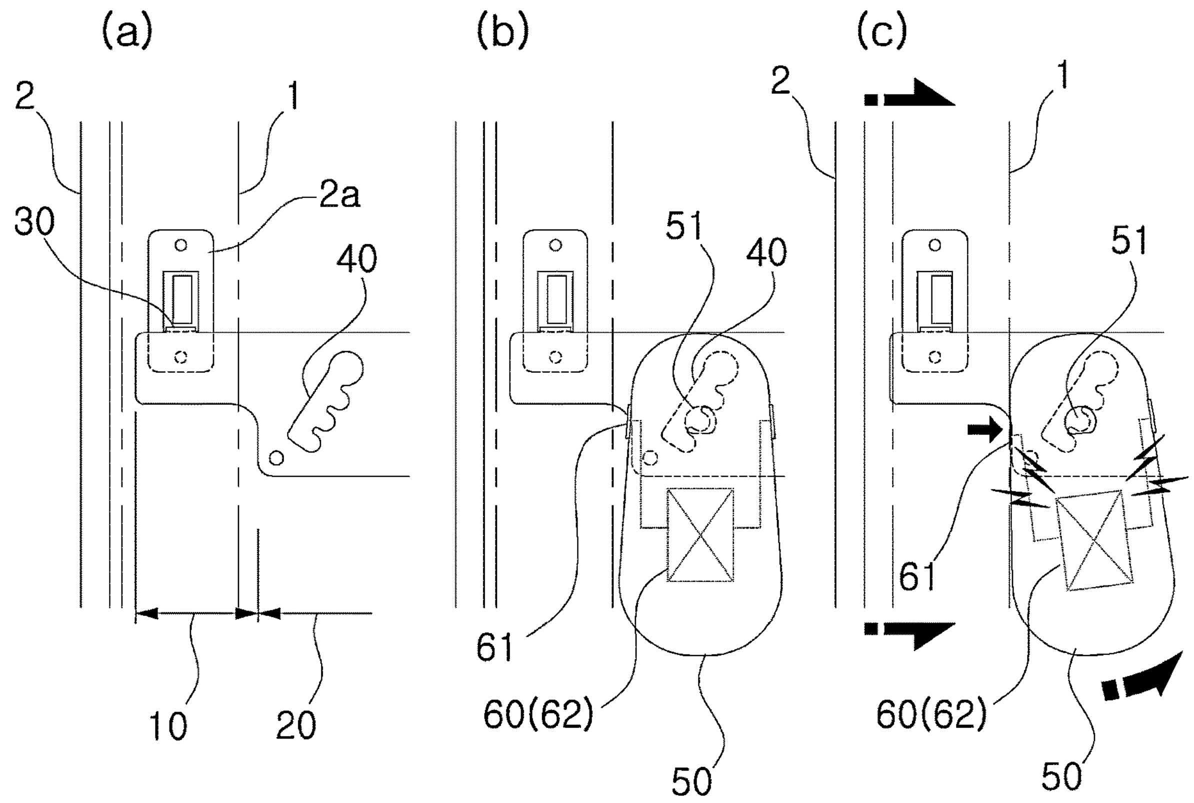
FIG. 7 is a configuration diagram illustrating an usage state of the self-acting door security device according to an embodiment of the present invention.
Figure 8:
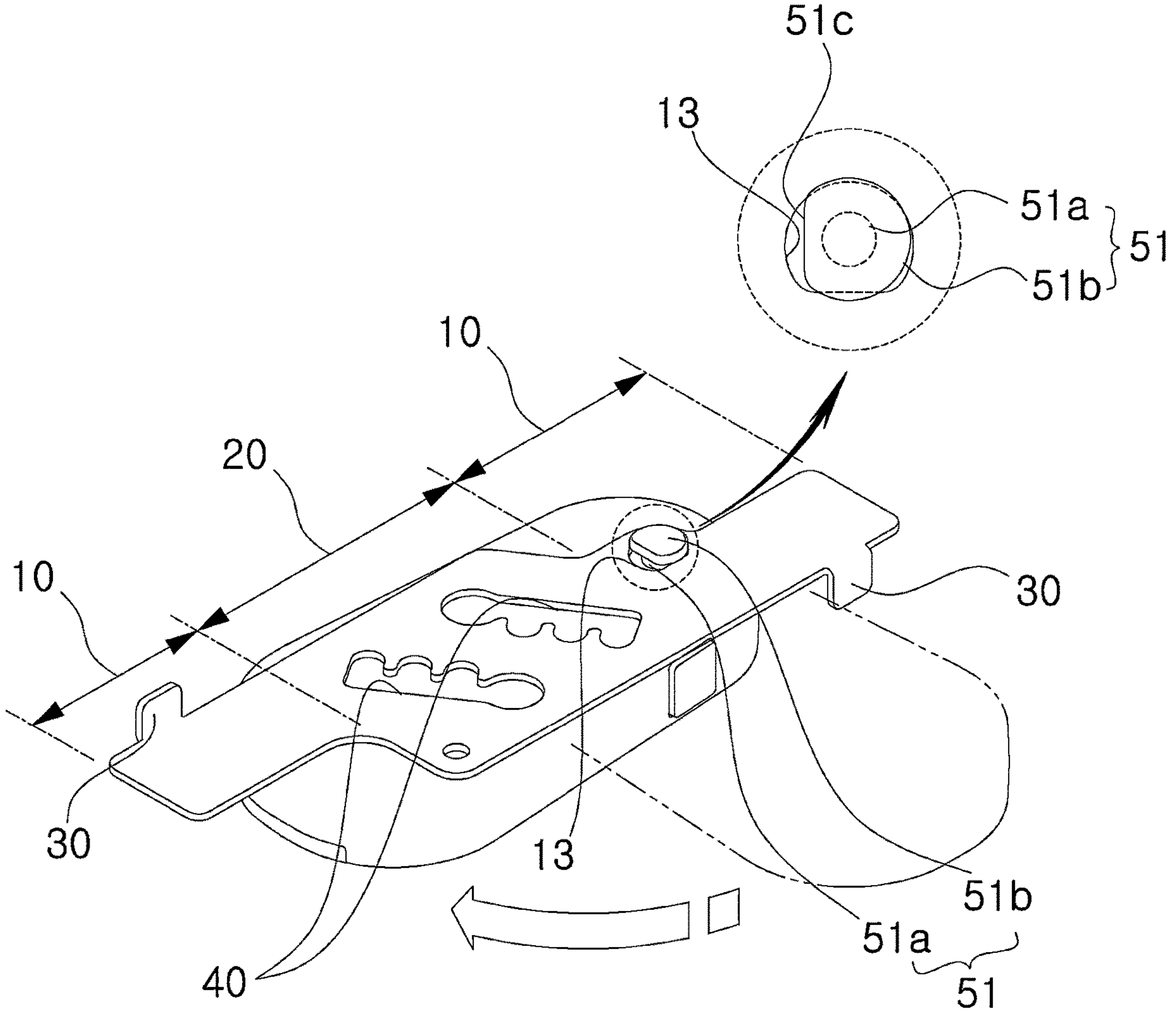
FIG. 8 is a configuration diagram illustrating an assembled state of a locker plate and a stopper member of the self-acting door security device according to an embodiment of the present invention.

FIG. 1 is a configuration diagram illustrating a self-acting door security device according to an embodiment of the present invention, FIG. 2 is a configuration diagram illustrating an installed state of the self-acting door security device according to an embodiment of the present invention, FIG. 3 is a cross-sectional view illustrating the installed state of the self-acting door security device according to an embodiment of the present invention, FIGS. 4 to 5 are configuration diagrams illustrating an insert plate and a stop holder of the self-acting door security device according to a modification of the present invention, FIG. 6 is a configuration diagram illustrating a state in which a door operates to open without interference with the insert plate of the self-acting door security device according to an embodiment of the present invention, FIG. 7 is a configuration diagram illustrating an usage state of the self-acting door security device according to an embodiment of the present invention, and FIG. 8 is a configuration diagram illustrating an assembled state of a locker plate and a stopper member of the self-acting door security device according to an embodiment of the present invention.

The present invention relates to a self-acting door security device which includes a latch bolt **1*b* of a locking module 1*a* installed on a swinging door 1, wherein the latch bolt 1*b* engages with a latch hole 2*b* of a striker 2*a* mounted on a door frame 2 to enable the locking/unlocking operation of the swinging door 1. The self-acting door security device can be easily installed in a gap between a door and a door frame to secure personal safety by quickly detecting forced opening of the door by an intruder, and particularly, is improved in structure such that the door can be opened without interference from a latch bolt even in a malfunction condition that the latch bolt of an existing lock module installed on the door cannot be not fully inserted, thereby enabling quick evacuation in emergency situations, such as fires. The self-acting door security device includes an insert plate 10, a locker plate 20, a fastening piece 30, a stop holder 40, and a stopper member 50**.

The insert plate 10 according to the present invention is provided to be inserted into a gap 3 between the door 1 and the door frame 2.

The insert plate 10 is integrally formed with the locker plate 20 which will be described below.

The insert plate 10 is formed with a thickness that can be inserted into the gap 3 between the door 1 and the door frame 2.

The insert plate 10 is arranged in such a way as not to align with a movement path of the latch bolt 1*b* as illustrated in FIG. 1, thereby avoiding interference from the latch bolt 1*b* of the locking module 1*a* when the door is opened.

Accordingly, as illustrated in FIG. 6, the self-acting door security device is improved in structure such that the door 1 can be opened without interference from a latch bolt 1*b* even in a malfunction condition that the latch bolt 1*b* of an existing lock module 1*a* installed on the door 1 cannot be not fully inserted, thereby enabling quick evacuation in emergency situations, such as fires.

Furthermore, the locker plate 20 according to the present invention is connected to the insert plate 10 to be exposed outside the gap 3.

The locker plate 20 is integrally formed with the insert plate 10.

The locker plate 20 provides an installation space for mounting a stopper member 50, which will be described later.

Additionally, the fastening piece 30 according to the present invention protrudes from the outer end of the insert plate 10, and is configured to engage with and restrained in the latch hole 2*b* of the striker 2*a*.

The fastening piece 30 protrudes in the thickness direction of the insert plate 10.

The fastening piece 30 is formed in a plate shape and is hooked and fastened to the top or the bottom of the latch hole 2*b*.

For example, as illustrated in FIGS. 1 to 2, the fastening piece 30 is integrally bent at a right angle to the insert plate 10.

On the other hand, the insert plate 10 and the fastening piece 30 are arranged at one position on one end of the locker plate 20 as illustrated in FIG. 4, or installed at two positions on both ends of the locker plate 20 in the opposite directions to each other as illustrated in FIG. 5, to be applied to both left and right opening type doors.

Furthermore, in a case in which the insert plate 10 and the fastening piece 30 are applied in a pair on both ends of the locker plate 20, a pair of stop holders 40 are arranged at a position corresponding to the insert plate 10. The pair of stop holders 40 are placed at different intervals from the locker plate 20. One of the pair of stop holders 40 is selectively applied in correspondence to the thickness of the door, thereby adjusting the mounting position of the stopper member 50, which will be described later.

Moreover, the stop holder 40 according to the present invention is formed through the locker plate 20.

Additionally, the stopper member 50 according to the present invention includes a stop pin 51 which is formed to be fastened to the stop holder 40, and restrains the door 1 in a state in which the stopper member is mounted on the locker plate 20 through the stop pin 51.

At this time, the stop pin 51 includes a shaft 51*a* installed on the stopper member 50 and fitted into the stop holder 40, and an expansion piece 51*b* expanding at the end of the shaft 51*a* and restrained at the rear surface of the stopper member 50.

In addition, the stop holder 40 includes an insertion hole 41 through which the expansion piece 51*b* is inserted, and a fitting hole 42 connected to the insertion hole 41 and having a size smaller than that of the insertion hole 41 to engage with the shaft 51*a*. The fitting hole 42 is formed in the opposite direction to the insert plate 10 centered on the insertion hole 41.

After the expansion piece 51*b* of the stop pin 51 is inserted through the insertion hole 41 of the stop holder 40, when the shaft 51*a* of the stop pin 51 is fit and coupled to the fitting hole 42 of the stop holder 40, the expansion piece 51*b* is hooked and restrained to the rear surface of the locker plate 20 to support the stopper member 50.

For example, as illustrated in FIGS. 4(*a*) and 5(*a*), a plurality of stop holders 40 are spaced apart from each other, are respectively placed at different distances from the fastening piece 30, and are provided to adjust the installation spacing of the stopper members 50 according to door specifications.

In another embodiment, as illustrated in FIGS. 4(*b*) and 5(*b*), the stop holder 40 includes an insertion hole 41 into which the expansion piece 51*b* is inserted, an inclined rail 43 which is connected to the insertion hole 41, has an elongated hole having a diameter smaller than that of the insertion hole 41 to accommodate the shaft 51*a*, and is formed with a slope angle inclining toward the fastening piece 30 as it goes downwards, and a fitting hole 42 which is arranged on the inclined rail 43 to be spaced, has a size smaller than that of the insertion hole 41 to engage with the shaft 51*a*. The fitting hole 42 is formed in the opposite direction to the insert plate 10 based on the inclined rail 43.

Additionally, when the shaft 51*a* moves downward along the inclined rail 43, the stopper member 50 is inclinedly moved so that the shaft 51*a* is restrained by engaging with the fitting hole 42 at the point where the stopper member 50 is in close contact with the door 1.

As described above, when the shaft 51*a* moves along the inclined rail 43 at the slope angle, the gap between the door 1 and the stopper member 50 is adjustable, so it provides versatility to apply the stopper member 50 to doors 1 of various thicknesses.

At this time, an intrusion detection unit 60 is installed on the stopper member 50, to detect the operational force in the opening direction of the door 1.

The intrusion detection unit 60 includes a sensor 61 exposed to the outer peripheral surface of the stopper member 50 to detect the operational force in the opening direction of the door 1, and an alarm module 62 which operates according to the detection signal from the sensor 61 to output one or more alarm signals such as a sound alarm, warning light, vibration, or message transmission between mobile devices using near-field communication.

Referring to FIG. 7, a usage state of the intrusion detection unit 60 will be described. When the door 1 is opened, the door 1 is operated to be closed while the fastening piece 30 is inserted into the latch hole 2*b* of the striker 2*a*, so the insert plate 10 is restrained to the gap 3, and when the stop pin 51 of the stopper member 50 is fastened to the stop holder 40 of the locker plate 20, the door 1 is limited in movement in the opening direction by the stopper member 50.

Thereafter, when a forced opening force is applied to the door 1 by an intruder, as illustrated in FIG. 7(*c*), at the moment that the switch 61 of the intrusion detection unit 60 is touched by the door 1, the alarm module 62 outputs an alarm signal, thus allowing a user to quickly recognize the unauthorized door opening by an intruder and ensuring personal safety.

In FIG. 8, the expansion piece 51*b* is formed in a circular shape, and includes a key surface 51*c* formed on the outer circumferential surface thereof, and a mating hole 13 formed on the locker plate 20 to have the same shape as the expansion piece 51*b*.

Furthermore, after the expansion piece 51*b* is inserted into the mating hole 13 at a predetermined angle in alignment with the mating hole 13, when the angle of the stopper member 50 is changed, the stopper member 50 is mounted on the locker plate 20 while the key surface of the expansion piece 51*b* is restrained in a misaligned state with the mating hole 13, thereby preventing loss during storage.

Additionally, the stop pin 51 is eccentrically positioned towards one side at the longitudinal center of the stopper member 50.

In addition, the switch 61 of the intrusion detection unit 60 is arranged on the side of the stopper member 50 corresponding to the stop pin 51.

Therefore, when the stop pin 51 of the stopper member 50 is mounted on the stop holder 40, the switch 61 maintains an upright position so that the end of the stopper member 50 where the stop pin 51 is located at the upper portion due to its weight, and is arranged to face the door 1, such that the switch 61 can accurately detect even the slightest opening operational force of the door 1.

The invention claimed is:

1. A self-acting door security device comprising:

a latch bolt of a locking module configured to be installed on a swinging door, and the latch bolt configured to engage with a latch hole of a striker mounted on a door frame to enable the locking/unlocking operation of the swinging door;

an insert plate configured to be inserted into a gap between the swinging door and the door frame;

a locker plate integrally formed with the insert plate;

a fastening piece protruding on an outer end of the insert plate and configured to engage with the latch hole of the striker;

a stop holder formed through the locker plate; and a stopper member including a stop pin which is configured to be fastened to the stop holder of the locker plate to prevent movement of the door;

wherein the stop pin includes:

a shaft fitted into the stop holder, and an expansion piece formed at an end of the shaft, wherein the stop holder includes:

an insertion hole into which the expansion piece is inserted;

an inclined rail which is connected to the insertion hole, has an elongated hole having a diameter smaller than that of the insertion hole to accommodate the shaft, and is formed with a slope angle inclining toward the fastening piece; and a fitting hole which is arranged on the inclined rail, has a size smaller than that of the insertion hole to engage with the shaft, wherein the fitting hole is formed in the opposite direction to the insert plate based on the inclined rail, and wherein when the shaft moves downward along the inclined rail, the stopper member is inclinedly moved so that the shaft is limited in movement by engaging with the fitting hole at a point where the stopper member is in contact with the door.

2. A self-acting door security device comprising:

a latch bolt of a locking module configured to be installed on a swinging door, and the latch bolt configured to engage with a latch hole of a striker mounted on a door frame to enable the locking/unlocking operation of the swinging door;

an insert plate configured to be inserted into a gap between the swinging door and the door frame;

a locker plate integrally formed with the insert plate;

a fastening piece protruding on an outer end of the insert plate, and configured to engage with the latch hole of the striker;

a stop holder formed through the locker plate; and a stopper member including a stop pin which is configured to be fastened to the stop holder of the locker plate to prevent movement of the door, wherein the stop pin includes a shaft fitted into the stop holder, and an expansion piece formed at an end of the shaft, wherein the expansion piece is formed in a circular shape, and includes a key surface formed on an outer circumferential surface thereof, and a mating hole formed on the locker plate to have the same shape as the expansion piece, and wherein after the expansion piece is inserted into the mating hole at a predetermined angle in alignment with the mating hole, when the angle of the stopper member is changed, the stopper member is mounted on the locker plate while the key surface of the expansion piece is constrained in a misaligned state with the mating hole, thereby preventing loss during storage.

3. A self-acting door security device, comprising:

a latch bolt of a locking module configured to be installed on a swinging door, and the latch bolt configured to engage with a latch hole of a striker mounted on a door frame to enable the locking/unlocking operation of the swinging door;

an insert plate configured to be inserted into a gap between the swinging door and the door frame;

a locker plate integrally formed with the insert plate;

a fastening piece protruding on an outer end of the insert plate, and configured to engage with the latch hole of the striker;

a stop holder formed through the locker plate;

a stopper member including a stop pin which is configured to be fastened to the stop holder of the locker plate to prevent movement of the door; and an intrusion detection unit installed on the stopper member to detect operational force in an opening direction of the door, wherein the intrusion detection unit comprises:

a sensor exposed to the outer peripheral surface of the stopper member to detect the operational force in the opening direction of the door;

an alarm module operating according to a detection signal from the sensor to output one or more alarm signals such as a sound alarm, warning light, vibration, or message transmission between mobile devices using near-field communication, and a switch; and wherein the stop pin is eccentrically positioned towards one side at the longitudinal center of the stopper member, wherein the switch of the intrusion detection unit is arranged on a side of the stopper member corresponding to the stop pin, and wherein when the stop pin of the stopper member is mounted on the stop holder, the switch maintains an upright position so that an end of the stopper member where the stop pin is located at the upper portion due to its weight, and is arranged to face the door, such that the switch can accurately detect even the slightest opening operational force of the door.

4. The self-acting door security device according to claim 1, further comprising:

an intrusion detection unit installed on the stopper member to detect operational force in an opening direction of the door, wherein the intrusion detection unit comprises:

a sensor exposed to an outer peripheral surface of the stopper member to detect the operational force in the opening direction of the door; and an alarm module operating according to a detection signal from the sensor to output one or more alarm signals such as a sound alarm, warning light, vibration, or message transmission between mobile devices using near-field communication.

5. The self-acting door security device according to claim 4, wherein when the door is opened, the door is operated to be closed while the fastening piece is inserted into the latch hole of the striker, so the insert plate is limited in movement to the gap, when the stop pin of the stopper member is fastened to the stop holder of the locker plate, the door is limited in movement in the opening direction by the stopper member, and when a forced opening force is applied to the door by an intruder, at the moment that a switch of the intrusion detection unit is touched by the door, the alarm module outputs an alarm signal.

6. The self-acting door security device according to claim 2, further comprising:

an intrusion detection unit installed on the stopper member to detect operational force in an opening direction of the door, wherein the intrusion detection unit comprises:

a sensor exposed to an outer peripheral surface of the stopper member to detect the operational force in the opening direction of the door; and an alarm module operating according to a detection signal from the sensor to output one or more alarm signals such as a sound alarm, warning light, vibration, or message transmission between mobile devices using near-field communication.

7. The self-acting door security device according to claim 6, wherein when the door is opened, the door is operated to be closed while the fastening piece is inserted into the latch hole of the striker, so the insert plate is limited in movement to the gap, when the stop pin of the stopper member is fastened to the stop holder of the locker plate, the door is limited in movement in the opening direction by the stopper member, and when a forced opening force is applied to the door by an intruder, at the moment that a switch of the intrusion detection unit is touched by the door, the alarm module outputs an alarm signal.

8. The self-acting door security device according to claim 1, wherein the insert plate and the fastening piece are installed on both ends of the locker plate in opposite directions to each other.

9. The self-acting door security device according to claim 2, wherein the insert plate and the fastening piece are installed on both ends of the locker plate in opposite directions to each other.

10. The self-acting door security device according to claim 1, wherein the stop holder and one or more stop holders are spaced apart from each other, are respectively placed at different distances from the fastening piece, and are provided to adjust the installation spacing of the stopper members according to door specifications.

11. The self-acting door security device according to claim 2, wherein the stop holder and one or more stop holders are spaced apart from each other, are respectively placed at different distances from the fastening piece, and are provided to adjust the installation spacing of the stopper members according to door specifications.

12. The self-acting door security device according to claim 1, wherein the expansion piece of the stop pin is formed to be expanded at the end of the shaft to be limited in movement at the rear surface of the stopper member.

13. The self-acting door security device according to claim 2, wherein the expansion piece of the stop pin is formed to be expanded at the end of the shaft to be limited in movement at the rear surface of the stopper member.

* * * * *